US007817710B2

(12) United States Patent
Nakamori et al.

(10) Patent No.: US 7,817,710 B2
(45) Date of Patent: Oct. 19, 2010

(54) MOBILE COMMUNICATION TERMINAL

(75) Inventors: Takeshi Nakamori, Yokohama (JP);
Hiroyuki Ishii, Yokosuka (JP); Yousuke Iizuka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 952 days.

(21) Appl. No.: 11/499,717

(22) Filed: Aug. 7, 2006

(65) Prior Publication Data

US 2007/0036205 A1 Feb. 15, 2007

(30) Foreign Application Priority Data

Aug. 10, 2005 (JP) ............................ P2005-232564

(51) Int. Cl.
*H04B 1/00* (2006.01)
(52) U.S. Cl. ..................... 375/148; 375/147; 375/130; 375/136; 375/316
(58) Field of Classification Search ................. 375/148, 375/147, 130, 136
See application file for complete search history.

(56) References Cited

U.S. PATENT DOCUMENTS

| 6,259,720 | B1 * | 7/2001 | Buss et al. ................ 375/130 |
| 6,351,462 | B1 * | 2/2002 | Komatsu .................... 370/342 |
| 6,510,143 | B1 * | 1/2003 | Bejjani et al. ............... 370/320 |
| 7,292,556 | B2 * | 11/2007 | Matsumoto ................. 370/335 |
| 2002/0110188 | A1 * | 8/2002 | Ohmori et al. ............. 375/232 |
| 2003/0021334 | A1 * | 1/2003 | Levin et al. ................. 375/147 |
| 2003/0053524 | A1 * | 3/2003 | Dent ......................... 375/148 |
| 2004/0037351 | A1 * | 2/2004 | Itoh ........................... 375/149 |
| 2005/0243955 | A1 * | 11/2005 | Mondragon-Torres et al. ..................... 375/347 |
| 2005/0282568 | A1 * | 12/2005 | Keerthi ....................... 455/502 |
| 2007/0183535 | A1 * | 8/2007 | Maravic et al. ............. 375/316 |

FOREIGN PATENT DOCUMENTS

| JP | 11-112386 | 4/1999 |
| JP | 2001-36451 | 2/2001 |
| JP | 2002-247007 | 8/2002 |
| JP | 2003-218836 | 7/2003 |
| JP | 2004-080555 | 3/2004 |
| JP | 2004-229305 | 8/2004 |

(Continued)

OTHER PUBLICATIONS

Anja Klein, "Data Detection Algorithms Specially Designed for the Downlink of CDMA Mobile Radio Systems", IEEE 47th Vehicular Technology Conference Proceedings, vol. 1, May 4-7, 1997, pp. 203-207.

(Continued)

*Primary Examiner*—Shuwang Liu
*Assistant Examiner*—Kenneth Lam
(74) *Attorney, Agent, or Firm*—Oblon, Spivak, McClelland, Maier & Neustadt, L.L.P.

(57) ABSTRACT

There is disclosed a mobile communication terminal equipped with a multipath interference canceller for canceling multipath interference, comprising number-of-samples controlling unit for controlling a number of samples to be sampled from a received signal, channel matrix generating unit for generating a channel matrix on the basis of sample data of samples as many as the number controlled by the number-of-samples controlling means and, interference canceling emit for canceling multipath interference on the basis of the channel matrix generated by the channel matrix generating unit.

7 Claims, 10 Drawing Sheets

FOREIGN PATENT DOCUMENTS

| | | |
|---|---|---|
| JP | 2004-364321 | 12/2004 |
| JP | 2006-101308 | 4/2006 |
| JP | 2006-524971 | 11/2006 |
| TW | 540200 | 7/2003 |
| TW | I222790 | 10/2004 |
| WO | WO 2004/098087 A2 | 11/2004 |
| WO | WO 2006/077829 A1 | 7/2006 |

OTHER PUBLICATIONS

Teruo Kawamura, et al., "Comparison Between Multipath Interference Canceller and Chip Equalizer in HSDPA in Multipath Channel", IEEE, Vehicular Technology Conference, Proceedings vol. 1, May 6-9, 2002, pp. 459-463.

U.S. Appl. No. 11/814,221, filed Jul. 18, 2007, Iizuka, et al.

* cited by examiner

MOBILE COMMUNICATION TERMINAL

BACKGROUND OF THE INVENTION

1. Field of the Invention

The present invention relates to a mobile communication terminal equipped with a multipath interference canceller.

2. Related Background Art

In recent years, the rapid spread of the Internet has promoted diversification and increase of volume of information. In the mobile communication field, it has led to active research and development on next-generation wireless access systems for implementation of high-speed wireless communication. One of the next-generation wireless access systems is, for example, HSDPA (High Speed Downlink Packet Access). This HSDPA adopts the Adaptive Modulation and channel Coding (AMC) technology for varying the throughput according to a receiving environment of a mobile communication terminal. It is being studied in the HSDPA to equip a mobile communication terminal with a multipath interference canceller for canceling multipath interference, to enhance receiving performance of the mobile communication terminal and to improve the throughput.

Incidentally, a mobile communication terminal, when receiving a signal transmitted from a base station, also receives delayed waves. The delayed waves arise from reflection, scattering, and diffraction of the signal transmitted from the base station. Then the delayed waves cause multipath interference, so as to significantly affect the receiving performance of the mobile communication terminal. A method of reducing the influence of multipath interference due to the delayed waves is disclosed in the reference of A. Klein, "Data Detection Algorithms Specifically Designed for the Downlink of Mobile Radio Systems," Proc. of EEEE VTC '97, pp. 203-207, Phoenix, May 1997. T. Kawamura, K. Higuchi, Y Kishiyama, and M. Sawahashi, "Comparison between multipath interference canceller and chip equalizer in HSDPA in multipath channel," Proc. of IEEE VTC 2002, pp. 459-463, Birmingham, May 2002.

The multipath interference canceling method disclosed in the above reference will be described below with reference to FIGS. 8 to 10A and 10B. First, FIG. 8 shows a functional configuration of multipath interference canceller 90 used in this method. As shown in FIG. 8, the multipath interference canceller 90 has a delay profile creator 91, a channel matrix generator 92, a weight matrix generator 93, and an interference canceller 94.

The delay profile creator 91 despreads a signal transmitted through the use of a Common Pilot Channel (CPICH) from a base station, to generate a delay profile shown in FIG. 9. The horizontal axis of the delay profile shown in FIG. 9 represents time, and the vertical axis received power. The delay profile shown in FIG. 9 indicates that a desired wave SA arriving first has the largest received power SAP, a delayed wave SB arriving next has the smallest received power SBP, and a delayed wave SC arriving last has an intermediate received power SCP. p1 indicates a power difference between the received power SAP of the desired wave SA and the received power SBP of the delayed wave SB, and p2 a power difference between the received power SAP of the desired wave SA and the received power SCP of the delayed wave SC.

The delay profile creator 91 measures the received powers SAP-SCP and delay amounts d1, d2 of the respective received paths SA-SC, based on the delay profile shown in FIG. 9. It is noted that it is also possible to measure reception timings of the desired wave and delayed waves instead of the delay amounts. The delay profile creator 91 has an MF (Matched Filter) function.

The channel matrix generator 92 generates a channel matrix H shown in FIG. 10B, based on the number of taps (equalization window width) W and a maximum delay width D shown in FIG. 10A. The channel matrix H is expressed as a matrix of (W+D) rows and W columns. Here the number of taps W equals the number of samples for each path present in the maximum delay width D in generating the channel matrix H, and can be optionally set. FIG. 10A is a drawing showing only a portion corresponding to the lower part in the delay profile shown in FIG. 9.

The weight matrix generator 93 puts the channel matrix H shown in FIG. 10B, into mathematical expression 1 below to generate a weight matrix. In the mathematical expression 1 $\sigma^2$ represents noise power and I a unit matrix.

$$(\hat{H}^H \hat{H} + \sigma^2 I)^{-1} \hat{H}^H \qquad \text{[Mathematical Expression 1]}$$

The interference canceller 94 multiplies data on channels by the weight matrix to cancel the multipath interference.

Incidentally, the multipath interference cancellation by the high-accuracy method as described above requires the matrix calculations in chip units, and signal processing according to the number of samples. Therefore, it increases the computational complexity in the mobile communication terminal and the processing imposes heavy loads on the mobile communication terminal equipped with the multipath interference canceller. Furthermore, the aforementioned AMC technology requires feedback, and it increases the computational complexity to cause excess of arithmetic processing time, which will result in a time lag and disturb operation in the mobile communication system.

SUMMARY OF THE INVENTION

An aspect of embodiments of the present invention is to provide a mobile communication terminal capable of reducing the computational complexity in cancellation of multipath interference.

A mobile communication terminal according to the embodiment of the present invention is a mobile communication terminal equipped with a multipath interference canceller for canceling multipath interference, comprising: number-of-samples controlling means for controlling a number of samples to be sampled from a received signal; channel matrix generating means for generating a channel matrix on the basis of sample data of samples as many as the number controlled by the number-of-samples controlling means; and interference canceling means for canceling multipath interference on the basis of the channel matrix generated by the channel matrix generating means.

According to the embodiment of the present invention, the channel matrix is generated based on the sample data of the samples as many as the number controlled by the number-of-samples controlling means, and the multipath interference is canceled based on this channel matrix. This makes it feasible to reduce the number of samples to be sampled from the received signal, and the reduction in the number of samples enables reduction in the computational complexity in cancellation of the multipath interference.

In the mobile communication terminal of the embodiment of the present invention, preferably, the number-of-samples controlling means extracts sample data corresponding to a predetermined sampling rate from sample data sampled by an A/D converter, thereby controlling the number of samples.

This can reduce the number of samples to the number of sample data corresponding to the predetermined sampling rate.

In the mobile communication terminal of the embodiment of the present invention, preferably, the predetermined sampling rate is a sampling rate lower than a sampling rate in the A/D converter and $2^n$ times (n: an integer of not less than 0) as high as a chip rate. This can reduce the number of samples to the number of sample data corresponding to the sampling rate $2^n$ times as high as the chip rate.

In the mobile communication terminal of the embodiment of the present invention, preferably, the number-of-samples controlling means decreases a sampling rate in an A/D converter to a predetermined sampling rate upon activation of the multipath interference canceller, thereby controlling the number of samples. This can reduce the number of samples to the number of sample data corresponding to the predetermined sampling rate.

In the mobile communication terminal of the embodiment of the present invention, preferably, the predetermined sampling rate is a sampling rate $2^n$ times (n: an integer of not less than 0) as high as a chip rate. This can decrease the number of samples to the number of sample data corresponding to the sampling rate $2^n$ times as high as the chip rate.

In the mobile communication terminal of the embodiment of the present invention, preferably, the number-of-samples controlling means controls the number of samples in accordance with a number of taps of the multipath interference canceller. This can decrease the number of samples according to the number of taps.

In the mobile communication terminal of the embodiment of the present invention, preferably, the number-of-samples controlling means decreases the number of samples when the number of taps is not less than a predetermined threshold. This can decrease the number of samples only when the number of taps is not less than the predetermined threshold.

The mobile communication terminal of the embodiment according to the present invention is able to reduce the computational complexity in the cancellation of multipath interference.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Embodiments of the mobile communication terminal according to the present invention will be described below on the basis of the drawings. In each of the drawings the same elements will be denoted by the same reference symbols, without redundant description.

Figure 1:
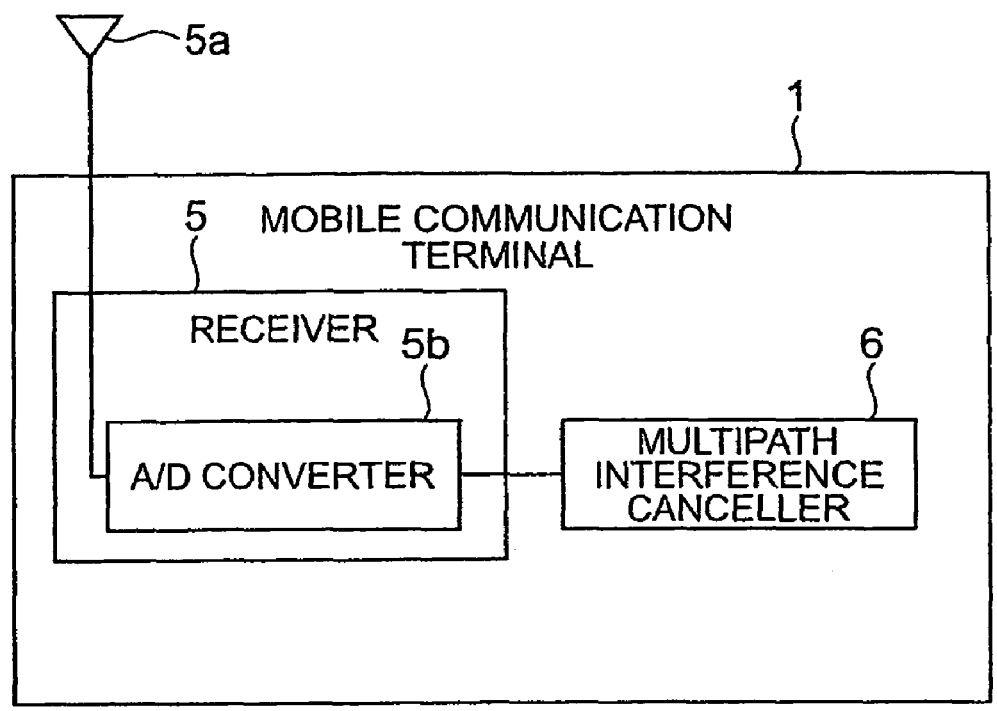
FIG. 1 is a diagram for exemplifying a schematic configuration of a mobile communication terminal in each embodiment.

As shown in FIG. 1, a mobile communication terminal 1 in each embodiment is provided with a receiver 5 for receiving a signal transmitted from a base station, and a multipath interference canceller 6 for canceling multipath interference from the received signal. The receiver 5 is provided with an A/D converter 5b for performing A/D conversion of a signal received through antenna 5a. The mobile communication terminal 1 in each embodiment is provided with a high-speed wireless communication function, for example, by HSDPA, to substantialize high-speed wireless communication at enhanced frequency utilization efficiency though the use of high-rate error correction coding, and multilevel modulation such as 16 QAM (Quadrature Amplitude Modulation) or 64 QAM. The mobile communication terminal corresponds, for example, to a cell phone, a personal handyphone system (PHS), a personal digital assistant (PDA) with a communication function, or the like.

The mobile communication terminal 1 according to the present invention is characterized in that the computational complexity in the cancellation of multipath interference is reduced by controlling the number of samples in a received signal. The mobile communication terminal in the first embodiment is characterized by controlling the number of samples on the multipath interference canceller 6 side, and the mobile communication terminal in the second embodiment by controlling the number of samples on the A/D converter 5b side. The mobile communication terminal in each of the embodiments will be described below.

First Embodiment

Figure 2:
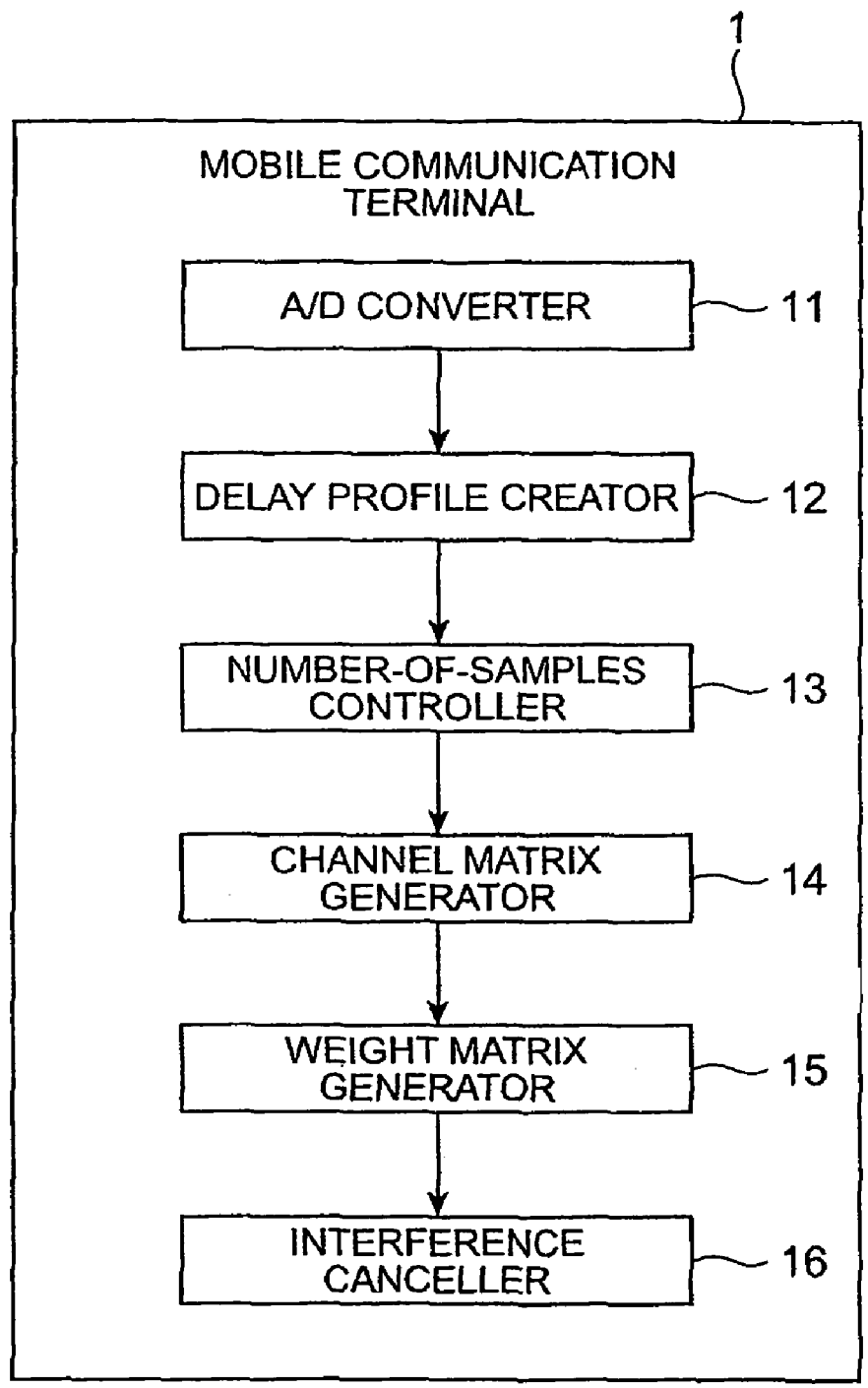
FIG. 2 is a diagram for exemplifying a functional configuration of a mobile communication terminal in a first embodiment.

FIG. 2 is a diagram for exemplifying a functional configuration of mobile communication terminal 1 in the first embodiment. As shown in FIG. 2, the mobile communication terminal 1 has an A/D converter 11, a delay profile creator 12, a number-of-samples controller 13, a channel matrix generator 14, a weight matrix generator 15, and an interference canceller 16.

The A/D converter 11 samples sample data from a received signal in accordance with a predetermined sampling rate, thereby performing A/D conversion. The A/D converter 11 in the present embodiment performs the A/D conversion at a sampling rate four times as high as the chip rate.

Figure 9:
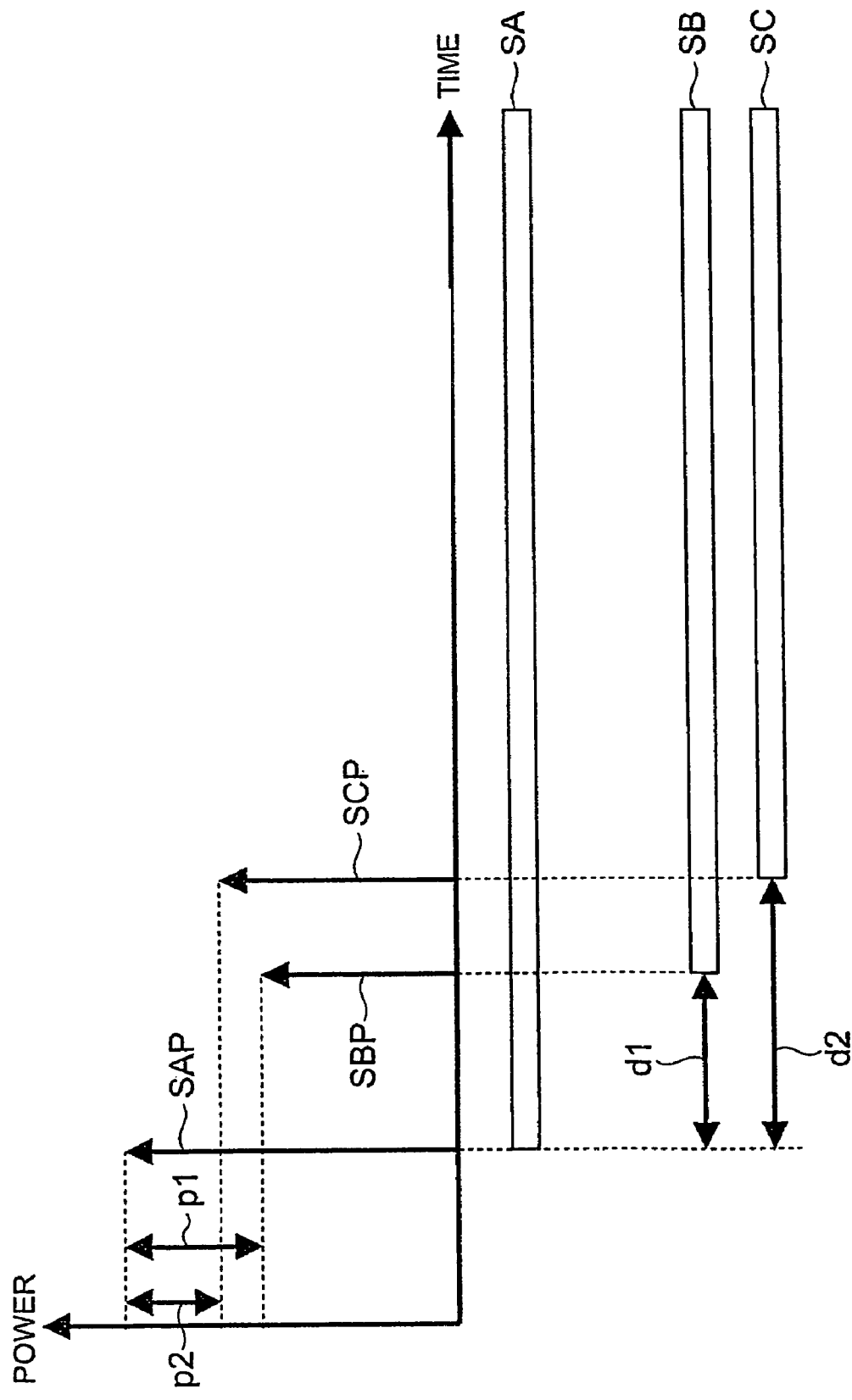
FIG. 9 is a diagram for explaining a delay profile.

The delay profile creator 12 despreads a signal transmitted through the use of the common pilot channel from a base station to create a delay profile shown in FIG. 9, in the same manner as the delay profile creator 91 described in the foregoing background art, did.

The number-of-samples controller 13 extracts sample data corresponding to a sampling rate for cancellation of interference (predetermined sampling rate) from the sample data sampled by the A/D converter 11. In the present embodiment the same sampling rate as the chip rate is set as the sampling rate for cancellation of interference. Therefore, when the number-of-samples controller 13 extracts the sample data, the sampling rate is decreased from the sampling rate four times as high as the chip rate to the same sampling rate as the chip rate. This enables the multipath interference cancellation using the sample data sampled at the same sampling rate as the chip rate.

The number-of-samples controller 13 controls the number of samples, according to the number of taps in the multipath interference canceller 6. Specifically, for example, when the number of taps is not less than a predetermined threshold, the number-of-samples controller 13 extracts the sample data corresponding to the sampling rate for interference cancellation, from the sample data sampled by the A/D converter 11. Namely, in this case the multipath interference cancellation is performed based on the sample data corresponding to the chip rate. On the other hand, when the number of taps is less than the predetermined threshold, the number-of-samples controller 13 does not extract the aforementioned sample data. Namely, in this case the multipath interference cancellation is carried out based on the sample data corresponding to the sampling rate four times as high as the chip rate.

An increase in the number of taps leads to an increase in the number of samples (channel estimates) for each path used in generation of the channel matrix H, so as to increase the number of rows and the number of columns in the channel matrix H. Therefore, the computational complexity with the use of the channel matrix H increases with increase in the number of taps, and it is thus feasible to achieve a significant effect of reduction in the computational complexity by reduction of the sampling rate. In contrast to it, the smaller the number of taps, the more the computational complexity with the use of the channel matrix H is reduced. Therefore, when the number of taps is small, implementation of higher-accuracy interference cancellation without decrease of the sampling rate might be more effective than reduction in the computational complexity with decrease of the sampling rate. Therefore, the present invention adopts controlling the number of samples according to the number of taps. The number of taps may be preliminarily set, or may be optionally varied according to communication circumstances or the like.

Figure 10A:
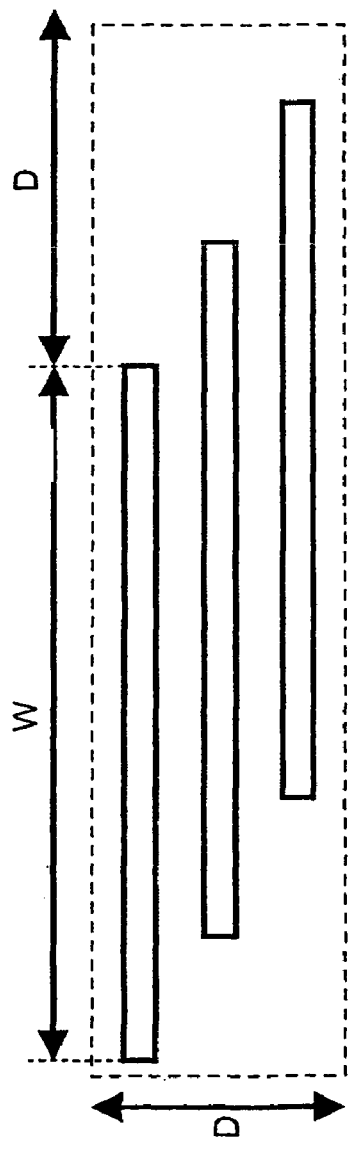
FIGS. 10A and 10B are respectively a diagram for explaining the relationship between the number of samples and the maximum delay width, and a diagram for explaining a channel matrix.
Figure 10B:
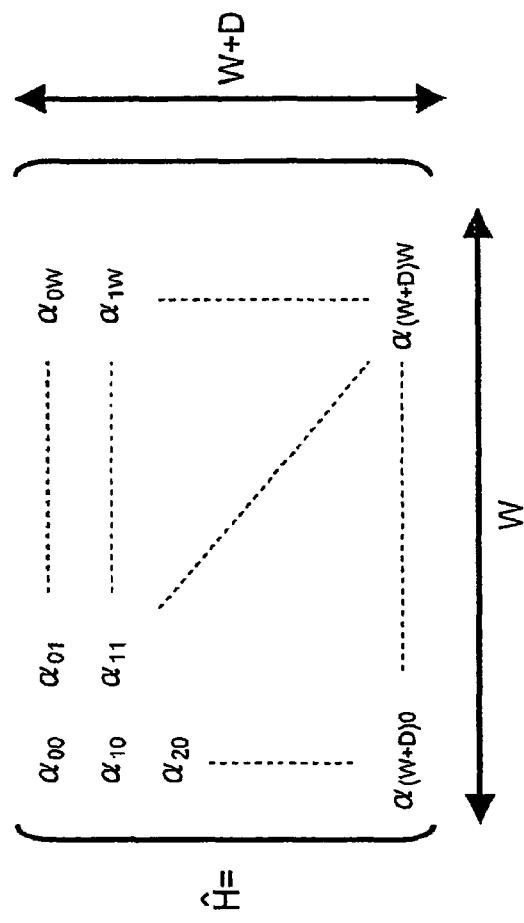

The channel matrix generator 14 generates the channel matrix H on the basis of the sample data of samples as many as the number controlled by the number-of-samples controller 13. Specifically, the channel matrix generator 14 generates the channel matrix H shown in FIG. 10B, based on the sample data corresponding to the sampling rate for interference cancellation or based on the sample data sampled at the sampling rate four times as high as the chip rate by the A/D converter 11.

The weight matrix generator 15 generates a weight matrix on the basis of the channel matrix H generated by the channel matrix generator 14, in the same manner as the weight matrix generator 93 in the aforementioned background art did.

The interference canceller 16 multiplies data on channels by the weight matrix generated by the weight matrix generator 15, to cancel the multipath interference, in the same manner as the interference canceller 94 in the aforementioned background art did.

Now, let us explain why the computational complexity in the multipath interference cancellation is reduced by lowering the sampling rate four times as high as the chip rate to the same sampling rate as the chip rate, with reference to FIGS. 3A, 3B, 4A and 4B.

Figure 3A:
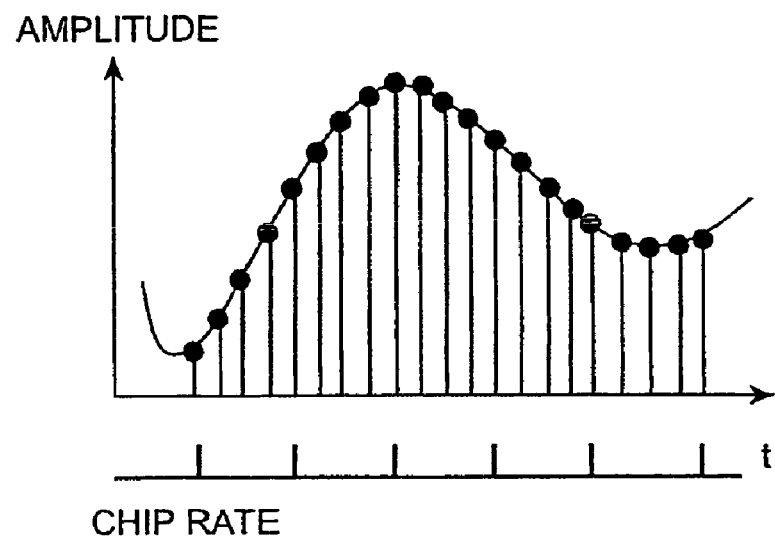
FIGS. 3A and 3B are respectively a graph showing sampling at a sampling rate 4 times as high as a chip rate, and a schematic diagram showing a channel matrix generated at that time.
Figure 3B:
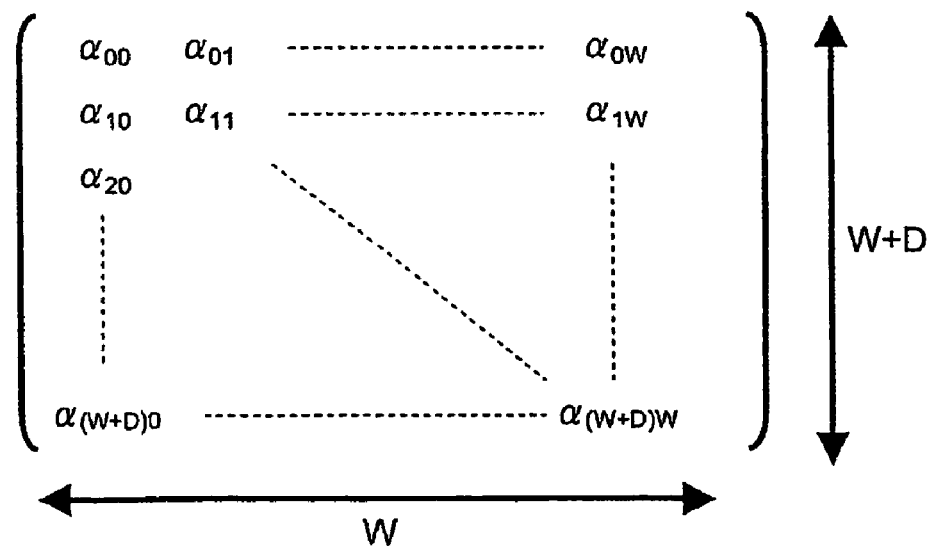
Figure 4A:
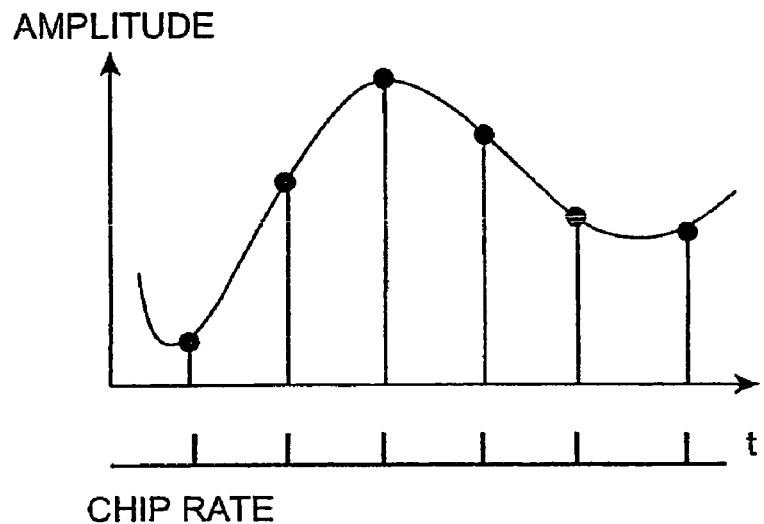
FIGS. 4A and 4B are respectively a graph showing sampling at a sampling rate equal to a chip rate, and a schematic diagram showing a channel matrix generated at that time.
Figure 4B:
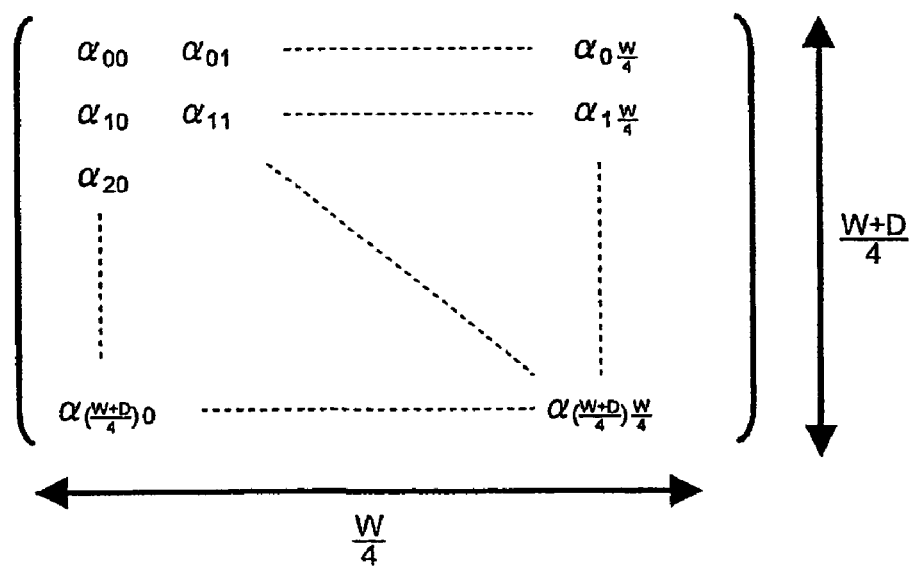

FIGS. 3A and 3B are drawings schematically showing the channel matrix H generated in sampling at the sampling rate four times as high as the chip rate, and FIGS. 4A and 4B are drawings schematically showing the channel matrix H generated in sampling at the same sampling rate as the chip rate. The number of rows and the number of columns in the channel matrix H shown in FIG. 4B each are a quarter of the number of rows and the number of columns in the channel matrix H shown in FIG. 3B. Namely, the reduction in the sampling rate results in decreasing the number of rows and the number of columns in the channel matrix H. The channel matrix H is put into the mathematical expression 1 for calculation of the aforementioned weight matrix. Therefore, the computational complexity is drastically reduced by calculating the weight matrix with the use of the channel matrix H after the decrease of the sampling rate.

The sampling rate for interference cancellation does not have to be limited to the same sampling rate as the chip rate, but may be any sampling rate lower than the sampling rate in the A/D converter 11 and $2^n$ times (n: an integer of not less than 0) as high as the chip rate. Therefore, since in the present embodiment the sampling rate in the A/D converter 11 is four times as high as the chip rate, the sampling rate for interference cancellation may be the sampling rate two times as high as the chip rate.

Next, Table 1 presents the results of theoretical calculation as to how different the computational complexity is depending upon sampling rates.

TABLE 1

| Sampling rate | Number of Mortifications | Number of additions |
| --- | --- | --- |
| Chip rate × 1 | 1.00 | 1.00 |
| Chip rate × 2 | 6.36 | 5.45 |
| Chip rate × 3 | 48.42 | 39.49 |

Each computational complexity presented in Table 1 indicates values of the number of multiplications and the number of additions at the sampling rate two times or four times as high as the chip rate, based on the reference value (1.00) for the number of multiplications and for the number of additions in the case where the sampling rate is the same as the chip rate. When the sampling rate was two times as high as the chip rate, the number of multiplications was 6.36 and the number of additions 5.45. When the sampling rate was four times as high as the chip rate, the number of multiplications was 48-42 and the number of additions 39.49.

Figure 5:
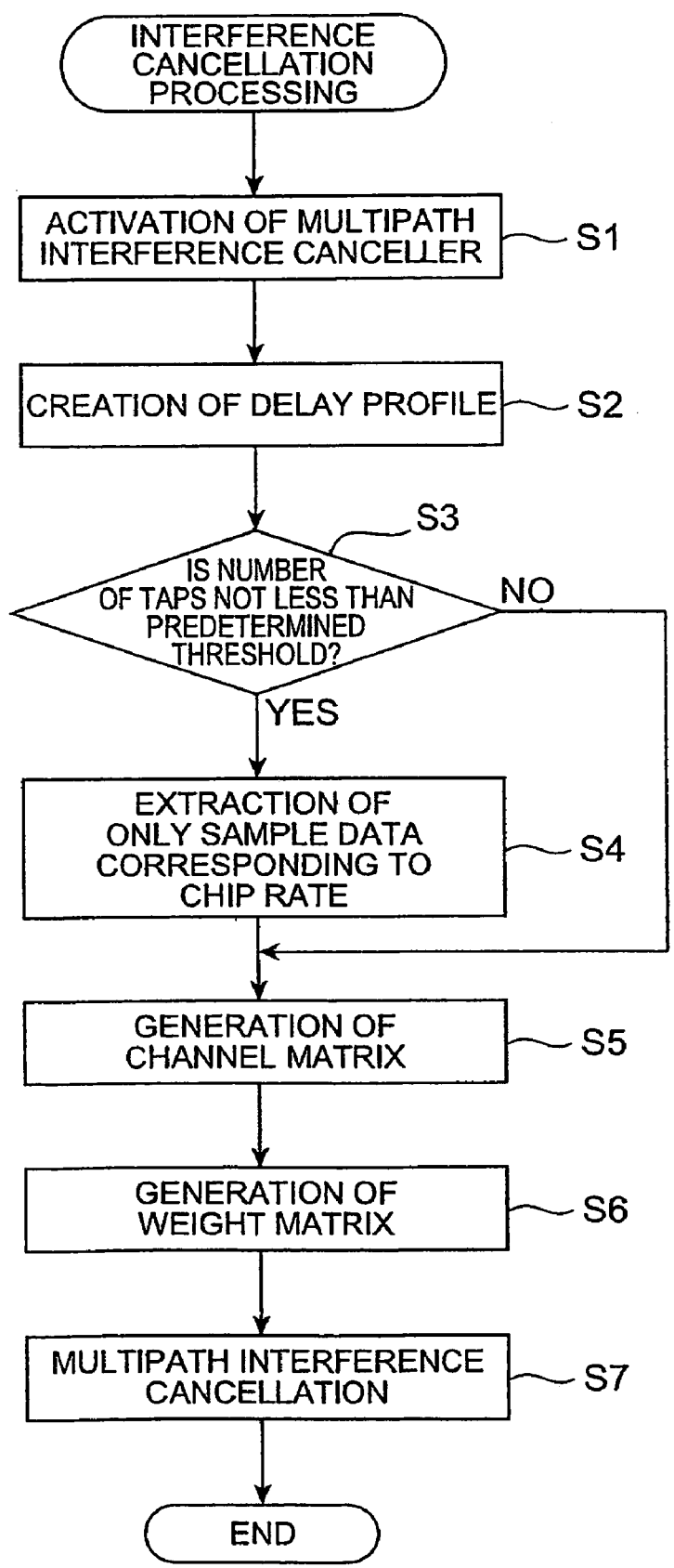
FIG. 5 is a flowchart for explaining an operation of the mobile communication terminal in the first embodiment.

Next, the operation of the mobile communication terminal 1 in execution of the multipath interference cancellation will be described with reference to FIG. 5.

First, upon activation of the multipath interference canceller 6 (step S1), the delay profile creator 12 of the mobile communication terminal 1 creates the delay profile (cf. FIG. 9), based on a control signal transmitted through the use of the common pilot channel (CPICH) from a base station (step S2).

Next, the number-of-samples controller 13 of the mobile communication terminal 1 determines whether the number of taps W of the multipath interference canceller 6 is not less than the predetermined threshold (step S3). When this determination is NO (step S3; NO), the processing is transferred to step S5.

On the other hand, when it is determined in step S3 that the number of taps W is not less than the predetermined threshold (step S3; YES), the number-of-samples controller 13 extracts sample data corresponding to the chip rate being the sampling rate for interference cancellation, from the sample data sampled by the A/D converter 11 (step S4).

Next, the channel matrix generator 14 generates the channel matrix on the basis of the sample data (step S5). Specifically, when the determination in step S3 is YES, the channel matrix generator 14 generates the channel matrix H on the basis of the sample data sampled at the chip rate being the sampling rate for interference cancellation. When the determination in step S3 is NO, the channel matrix generator 14 generates the channel matrix H on the basis of the sample data sampled at the sampling rate four times as high as the chip rate by the A/D converter 11.

Next, the weight matrix generator 15 puts the channel matrix generated by the channel matrix generator 14, into the aforementioned mathematical expression 1 to generate the weight matrix (step S6).

Next, the interference canceller 16 multiplies data on channels by the weight matrix to cancel the multipath interference (step S7).

As described above, the mobile communication terminal 1 of the first embodiment is configured to extract the sample data corresponding to the chip rate being the sampling rate for interference cancellation from the sample data sampled by the A/D converter 11, and thus is able to reduce the number of samples to the number of sample data corresponding to the chip rate. Since the channel matrix is generated based on this sample data, the number of rows and the number of columns in the channel matrix can be reduced thereby. This enables secure reduction in the computational complexity in calculation of the weight matrix.

The number-of-samples controller 13 in the first embodiment described above is configured to determine whether the sample data corresponding to the sampling rate for interference cancellation is to be extracted, based on whether the number of taps is not less than the predetermined threshold, but the method of controlling the number of samples according to the number of taps does not have to be limited to this method. For example, it is also possible to adopt a method of preliminarily determining sampling rates for respective numbers of taps and extracting the sample data corresponding to a sampling rate determined for each number of taps.

Second Embodiment

Figure 6:
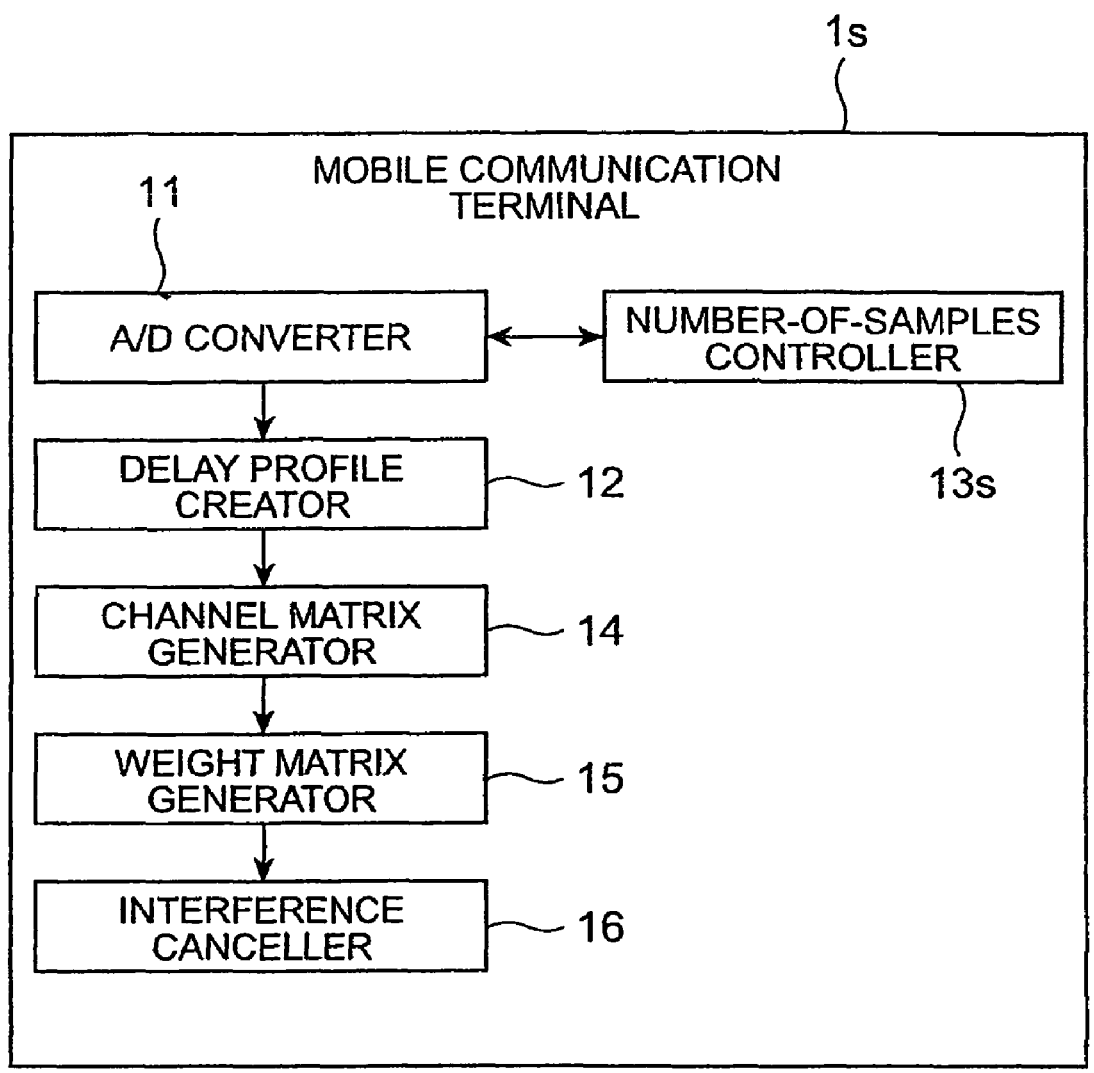
FIG. 6 is a diagram for exemplifying a functional configuration of a mobile communication terminal in a second embodiment.

The second embodiment of the present invention will be described below. A functional configuration of mobile communication terminal 1s in the second embodiment will be first described with reference to FIG. 6. As shown in FIG. 6, the mobile communication terminal 1s in the second embodiment has an A/D converter 11, a delay profile creator 12, a number-of-samples controller 13s, a channel matrix generator 14, a weight matrix generator 15, and an interference canceller 16.

The mobile communication terminal 1s in the second embodiment is different from the mobile communication terminal 1 in the first embodiment in that the number-of-samples controller 13s in the second embodiment is different in function from the number-of-samples controller 13 in the first embodiment. Therefore, the other functions are basically the same as those of the mobile communication terminal 1 in the first embodiment, and thus the components will be denoted by the same reference symbols, without redundant description thereof. The difference from the first embodiment will be described below in detail.

Upon activation of the multipath interference canceller 6, the number-of-samples controller 13s decreases the sampling rate in the A/D converter 11 to the sampling rate for interference cancellation (predetermined sampling rate). In the present embodiment the same sampling rate as the chip rate is set as the sampling rate for interference cancellation. In addition, the sampling rate four times as high as the chip rate is set as the sampling rate during the normal operation in the A/D converter 11. As was the case in the aforementioned first embodiment, the sampling rate for interference cancellation is not limited to the same sampling rate as the chip rate, but may be any sampling rate lower than the sampling rate in the A/D converter 11 and $2^n$ times (n: an integer of not less than 0) as high as the chip rate.

Therefore, upon activation of the multipath interference canceller 6, the sampling rate in the A/D converter 11 is reduced from the sampling rate four times as high as the chip rate to the same sampling rate as the chip rate. This enables the multipath interference cancellation using the sample data sampled at the same sampling rate as the chip rate.

When the multipath interference canceller 6 is deactivated, the number-of-samples controller 13s increases the sampling rate in the A/D converter 11 to the sampling rate during the normal operation. Therefore, upon deactivation of the multipath interference canceller 6, the sampling rate in the A/D converter 11 is increased from the same sampling rate as the chip rate to the sampling rate four times as high as the chip rate.

The number-of-samples controller 13s controls the number of samples in accordance with the number of taps (equalization window width) of the multipath interference canceller 6 in the same manner as in the first embodiment, and therefore the description thereof is omitted herein.

Figure 7:
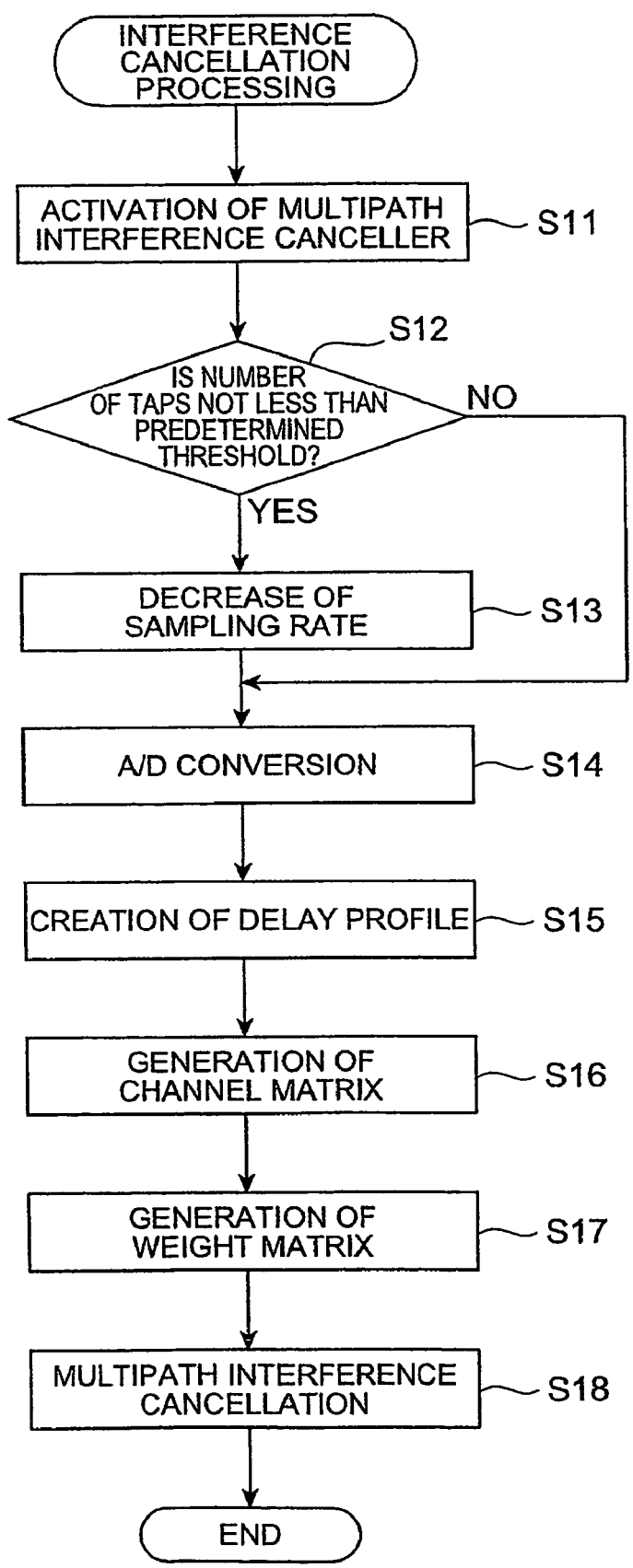
FIG. 7 is a flowchart for explaining an operation of the mobile communication terminal in the second embodiment.
Figure 8:
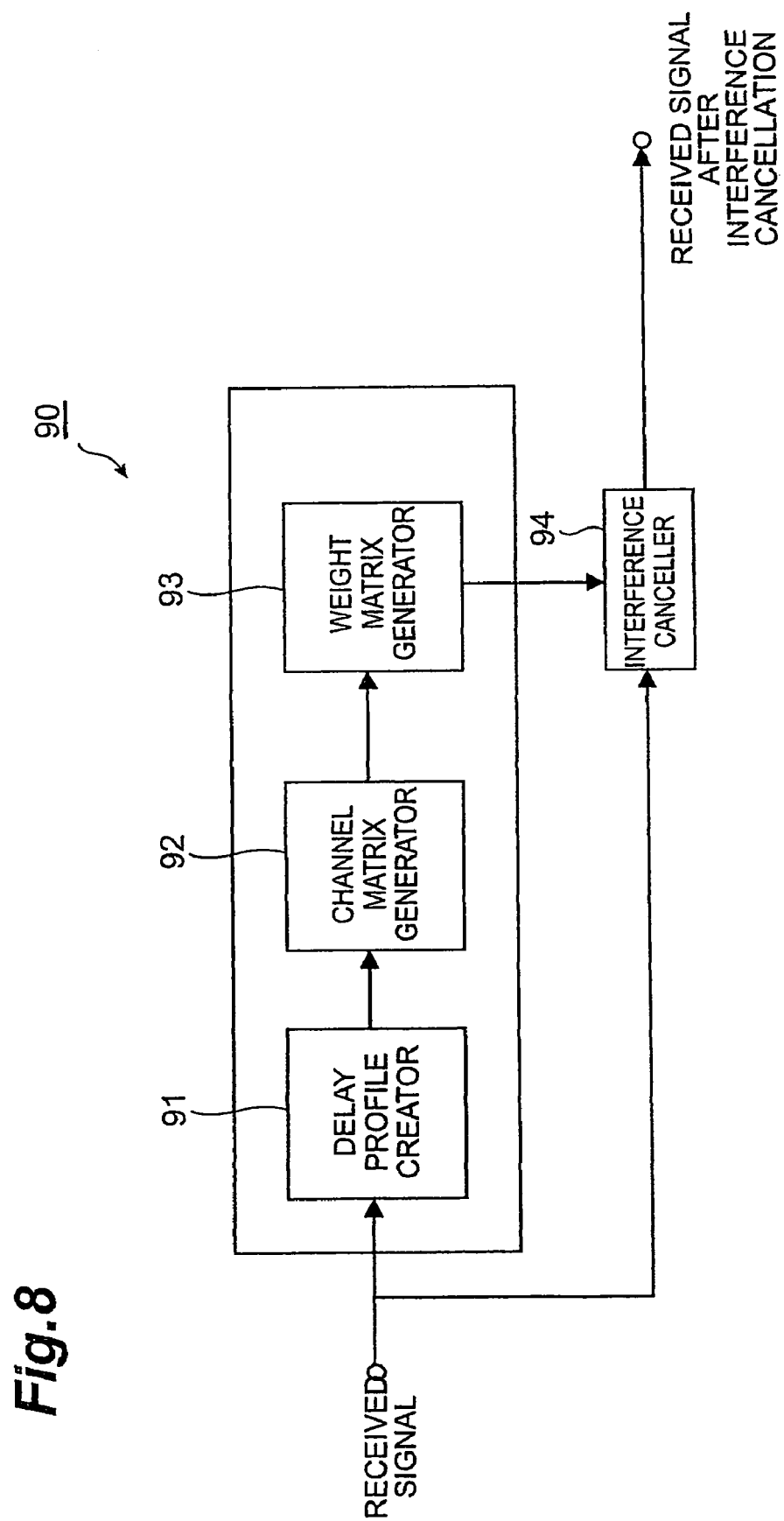
FIG. 8 is a diagram for exemplifying a functional configuration of a conventional multipath interference canceller.

Next, the operation of the mobile communication terminal 1s in execution of the multipath interference cancellation will be described with reference to FIG. 7.

First, upon activation of the multipath interference canceller 6 (step S11), the number-of-samples controller 13s of the mobile communication terminal 1s determines whether the number of taps W of the multipath interference canceller 6 is not less than the predetermined threshold (step S12). When this determination is NO (step S12; NO), the processing is transferred to step S14.

On the other hand, when it is determined in step S12 that the number of taps W is less than the predetermined threshold (step S12; YES), the number-of-samples controller 13s decreases the sampling rate in the A/D converter 11 to the chip rate being the sampling rate for interference cancellation (step S13).

Next, the A/D converter 11 samples sample data from the received signal in accordance with the sampling rate for interference cancellation, thereby performing A/D conversion (step S14).

Next, the delay profile creator 12 creates the delay profile (cf. FIG. 9), based on a control signal transmitted through the use of the common pilot channel (CPICH) from a base station (step S15).

Next, the channel matrix generator 14 generates the channel matrix on the basis of the sample data (step S16). Specifically, the channel matrix generator 14 generates the channel matrix H on the basis of the sample data sampled at the chip rate being the sampling rate for interference cancellation.

Next, the weight matrix generator 15 puts the channel matrix generated by the channel matrix generator 14, into the aforementioned mathematical expression 1 to generate the weight matrix (step S17).

Next, the interference canceller 16 multiplies data on channels by the weight matrix to cancel the multipath interference (step S18).

As described above, the mobile communication terminal is of the second embodiment is able to decrease the sampling rate in the A/D converter 11 to the chip rate being the sampling rate for interference cancellation, upon activation of the multipath interference canceller, and thus to decrease the number of samples to the number of sample data corresponding to the chip rate. In addition, since the channel matrix is generated based on the sample data, the number of rows and the number of columns in the channel matrix can be reduced thereby. This enables secure reduction in the computational complexity in calculation of the weight matrix.

The number-of-samples controller 13*s* in the second embodiment described above is configured to determine whether the sampling rate in the A/D converter 11 is to be decreased to the chip rate being the sampling rate for interference cancellation, based on whether the number of taps is not less than the predetermined threshold, but the method of controlling the number of samples according to the number of taps is not limited to this. For example, it is also possible to adopt a method of preliminarily determining sampling rates for respective numbers of taps and decreasing the sampling rate in the A/D converter 11 to a sampling rate determined for each number of taps.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication terminal equipped with a multipath interference canceller for canceling multipath interference, comprising:
    an A/D converter configured to sample data from a received signal waveform;
    number-of-samples controlling means for controlling a number of samples to be sampled from the sampled received signal waveform received from the A/D converter;
    channel matrix generating means for generating a channel matrix on the basis of sample data of corresponding to the number of samples controlled by the number-of-samples controlling means; and
    interference canceling means for canceling multipath interference on the basis of the channel matrix generated by the channel matrix generating means,
    wherein the number-of-samples controlling means controls the number of samples to be sampled from the sampled received signal waveform received from the A/D converter in accordance with a number of taps of the multipath interference canceller by decreasing the number of samples when the number of taps is determined not to be less than a predetermined threshold, and setting the number of samples to be the same as a number of samples output from the A/D converter when the number of taps is determined to be less than the predetermined threshold.

2. The mobile communication terminal according to claim 1, wherein the number-of-samples controlling means extracts sample data corresponding to a predetermined sampling rate from sample data sampled by the A/D converter of the mobile communication terminal, thereby controlling the number of samples.

3. The mobile communication terminal according to claim 2, wherein the predetermined sampling rate is a sampling rate lower than a sampling rate in the A/D converter and 2n times as high as a chip rate, wherein n is an integer not less than zero.

4. The mobile communication terminal according to claim 1, wherein the number-of-samples controlling means decreases a sampling rate in the A/D converter of the mobile communication terminal to a predetermined sampling rate upon activation of the multipath interference canceller, thereby controlling the number of samples.

5. The mobile communication terminal according to claim 4, wherein the predetermined sampling rate is a sampling rate 2n times as high as a chip rate, wherein n is an integer not less than zero.

6. A method implemented on a mobile communication terminal equipped with a multipath interference canceller for canceling multipath interference, the method comprising:
    sampling, at an A/D converter of the mobile communication terminal, data from a received signal waveform;
    controlling, at a number-of-samples controlling unit of the mobile communication terminal, a number of samples to be sampled from the sampled received signal waveform received from the A/D converter;
    generating, at a channel matrix generating unit of the mobile communication terminal, a channel matrix on the basis of sample data of samples as many as the number controlled by the number-of-samples controlling unit; and
    canceling, at an interference canceling unit of the mobile communication terminal, multipath interference on the basis of the channel matrix generated by the channel matrix generating unit,
    wherein the controlling includes controlling the number of samples to be sampled from the sampled received signal waveform received from the A/D converter in accordance with a number of taps of the multipath interference canceller by decreasing the number of samples when the number of taps is determined not to be less than a predetermined threshold, and setting the number of samples to be the same as a number of samples output from the A/D converter when the number of taps is determined to be less than the predetermined threshold.

7. A mobile communication terminal equipped with a multipath interference canceller for canceling multipath interference, comprising:
    an A/D converter configured to sample data from a received signal waveform;
    a number-of-samples controlling unit configured to control a number of samples to be sampled from the sampled received signal waveform received from the A/D converter;
    a channel matrix generating unit configured to generate a channel matrix on the basis of sample data of samples as many as the number controlled by the number-of-samples controlling unit; and
    an interference canceling unit configured to cancel multipath interference on the basis of the channel matrix generated by the channel matrix generating unit, wherein the number-of-samples controlling unit controls the number of samples to be sampled from the sampled received signal waveform received from the A/D converter in accordance with a number of taps of the multipath interference canceller by decreasing the number of samples when the number of taps is determined not to be less than a predetermined threshold, and setting the number of samples to be the same as a number of samples output from the A/D converter when the number of taps is determined to be less than the predetermined threshold.

* * * * *